United States Patent
Weichholdt et al.

(10) Patent No.: US 8,146,336 B2
(45) Date of Patent: Apr. 3, 2012

(54) HARVESTED CROP RESIDUE CHOPPING AND DISTRIBUTION ARRANGEMENT FOR A COMBINE WITH AN IMPELLER BLOWER

(75) Inventors: Dirk Weichholdt, Woelfing les Sarreguemines (FR); Rico Priesnitz, Blies-Ebersing (FR); Friedrich K Lauer, Krähenberg (DE); Oliver Klein, Saarlouis (DE); Chad Allen Dow, East Moline, IL (US); Joel David Ferris, Davenport, IA (US)

(73) Assignee: Deere & Company, Moline, IL (US)

( * ) Notice: Subject to any disclaimer, the term of this patent is extended or adjusted under 35 U.S.C. 154(b) by 155 days.

(21) Appl. No.: 12/547,604

(22) Filed: Aug. 26, 2009

(65) Prior Publication Data

US 2011/0053668 A1 Mar. 3, 2011

(51) Int. Cl.
*A01F 12/40* (2006.01)
(52) U.S. Cl. .......................................................... 56/112
(58) Field of Classification Search .................. 460/111, 460/112; 239/667–669
See application file for complete search history.

(56) References Cited

U.S. PATENT DOCUMENTS

| | | | |
|---|---|---|---|
| 4,917,652 A * | 4/1990 | Glaubitz et al. | 460/111 |
| 6,416,405 B1 * | 7/2002 | Niermann | 460/79 |
| 6,663,485 B2 * | 12/2003 | Niermann | 460/79 |
| 6,688,971 B2 * | 2/2004 | Buermann et al. | 460/112 |
| 6,719,627 B2 * | 4/2004 | Wolters et al. | 460/111 |
| 6,736,721 B2 * | 5/2004 | Niermann et al. | 460/112 |
| 7,086,942 B2 * | 8/2006 | Niermann et al. | 460/111 |
| 7,331,855 B2 * | 2/2008 | Johnson et al. | 460/112 |

* cited by examiner

*Primary Examiner* — Alicia Torres

(57) ABSTRACT

A harvested crop residue chopper-and distribution arrangement for a combine (10) has a straw chopper (60) with an outlet (80) arranged in the plane of the outlet (96), with at least one impeller blower (82) arranged downstream of the outlet (80) of the straw chopper (60) with impeller blades (84) that can be rotated in the plane of the impeller blower (98) about an axis of rotation (88), where the plane of the impeller blower (98) may be inclined relative to the plane of the outlet (96). The impeller blades (84) may be connected with a central body (92) that is connected to a cone (94) facing the outlet (80) of the straw chopper (60).

8 Claims, 2 Drawing Sheets

HARVESTED CROP RESIDUE CHOPPING AND DISTRIBUTION ARRANGEMENT FOR A COMBINE WITH AN IMPELLER BLOWER

FIELD OF THE INVENTION

The invention relates to agricultural combines. More particularly, it relates to crop processing elements of those combines. Even more particularly, it relates to a harvested crop residue chopper and distribution arrangement for a combine with a straw chopper.

BACKGROUND OF THE INVENTION

Agricultural combines are large machines that harvest, thresh, separate, and clean agriculturally planted harvested crop that carry corn. The cleaned corn, so obtained, is stored in a corn tank on the combine. As a rule, the threshed-out straw is either chopped and distributed on the field across the width of the cutter head or conducted around the straw chopper and deposited in a swath on the field without being chopped, in order to pick it up subsequently with a baler. The harvested crop residue remaining at the rear outlet of the cleaning arrangement, such as chaff and small straw particles, is distributed across the field by a chaff spreader or is conducted through the straw chopper and distributed across the field.

DE 199 08 111 C and DE 101 33 965 A describe combines with a straw chopper and two impeller blowers, arranged side by side alongside each other, that follow the straw chopper for the widely distributed straw ejection across the field. The outlet of the straw chopper and the inlet of the impeller blowers are arranged in a housing, that include impeller blades rotating about an approximately vertical axis and are arranged in a plane for the sake of unidirectional harvested crop transfer. The impeller blades are fastened to a central circular cylindrical shaft underneath a cover plate and are brought into rotation by a drive element arranged above the cover plate.

EP 1 074 175 A and US 2007/0015556A that is seen as establishing a class, describe impeller blowers in which the straw is thrown against the impeller blowers by means of an ejection drum without being chopped at an angle to the combine from above (EP 1 074 175 A) or through a straw chopper in the chopped form at an angle to the combine from below (US 2007/0015556A), the impeller blowers are built up by impeller blades on a circular disk and extend radially and vertically to the surface of the disk. The blades are configured in a wedge shape, where the outer ends of the blade have a greater vertical length than the inner ends of the blades. No blades are provided in the area of the axis of rotation. In EP 1 074 175 A, cylindrical bodies are located therethrough which the shaft driving the impeller blowers extends, while according to US 2007/0015556 A, a pot shaped attachment for the shaft is located there.

DE 100 63 554 A describes a combine with a straw chopper that rotates about a vertical axis and includes a conical body about whose circumference the chopper knives are attached in a spiral arrangement.

U.S. Pat. No. 1,625,353 A describes a combine whose straw shakers eject the straw without chopping it onto an impeller blower with a vertical axis of rotation. The impeller blower includes a conical disk, with blades arranged at its outer edge that extend vertically and radially to the outside.

As already noted, in the arrangement according to DE 199 08 111 C the outlet of the straw chopper and the inlet of the impeller blower are arranged in a single plane. However, such an arrangement has a disadvantage since the material delivered at the circumference of the straw chopper is inadequately engaged by the impeller blower, since only an (upper) part of it interacts with the lowest part of the impeller blade, while the remaining material falls to the ground. To avoid this problem, circular disks are attached underneath the impeller blades that rotate with the impeller blades, according to DE 101 33 965 A.

If the disk underneath the impeller blades were omitted in order to avoid the aforementioned problem and a non orthogonal angle between the axis of rotation of the impeller blower and the plane of the outlet of the straw chopper were provided, as is known from US 2007/0015556 A, a considerable part of the harvested crop would be thrown against the inner regions of the blades and towards the axis of rotation by the straw chopper, which would result in a problematical delivery of the harvested crop on the basis of the lower centrifugal force existing there and the missing impeller blades in the area of the axis of rotation. This problem also exists in the case of the arrangements according to EP 1 074 175 A and US 2007/0015556 A.

DE 100 63 554 A refers to only one straw chopper and cannot contribute to the solution of this problem, since it does not concern itself with the transition of the harvested crop residue from a straw chopper to an impeller blower, this is the same as U.S. Pat. No. 1,625,353 A that describes only one impeller blower.

SUMMARY OF THE INVENTION

The problem underlying the invention is seen in the need to make available harvested crop residue chopper and distribution arrangement of the kind cited initially for a combine, that permits an improved flow of harvested crop residue. This problem is solved according to the invention by the teaching of patent claim 1, where the further patent claims cite characteristics that further develop the solution to great advantage.

In accordance with one aspect of the Invention, a chopper and distribution arrangement for harvested crop residue is provided that includes a straw chopper with an outlet arranged in the plane of the outlet that chops the straw and/or the chaff conducted to it and ejects it in the plane of the outlet. An impeller blower (or two or more impeller blowers arranged side by side alongside each other) is arranged downstream of the outlet of the straw chopper that includes impeller blades that can be brought into rotation by an appropriate drive about an axis of rotation in the plane of a impeller blower. The plane of the outlet of the straw chopper and the plane of the impeller blower are inclined relative to each other—that is, they are not parallel to each other, but are arranged inclined to each other by an angle differing from 0°. Preferably the plane of the impeller blower is inclined downward relative to the forward operating direction of the combine and further to the rear than the plane of the outlet, so that the harvested crop residue ejected to the rear from the straw chopper is deflected downward by the impeller blower at the aforementioned angle. This angle avoids the aforementioned transition problems or the need for a lower disk located underneath the impeller blade. In order to prevent harvested crop residue from reaching the radially inner region of the impeller blower and being inadequately carried away from that area, the invention proposes that the impeller blades be connected to a central cylindrical body and to provide it with a conical shape facing the outlet of the straw chopper. The conical shape deflects harvested crop residue ejected by the straw chopper to the outside in a radial direction, so that it is grasped by the impeller blades and ejected. The actual body of the impeller blower of the inner region rotates at a low circumferential speed or none and covers it so that no harvested crop residue exists there.

BRIEF DESCRIPTION OF THE DRAWINGS

An embodiment of the invention is explained on the basis of the illustrations.

DETAILED DESCRIPTION OF THE PREFERRED EMBODIMENT

In the following description and claims, directions such as "front", "forward", "forwardly" refer to the forward operating direction of the combine 10 (i.e. pointing to the left in FIG. 1). Directions such as "rear", "rearward", "rearwardly", refer to a direction that is opposite to the forward operating direction of the combine 10.

Figure 1:
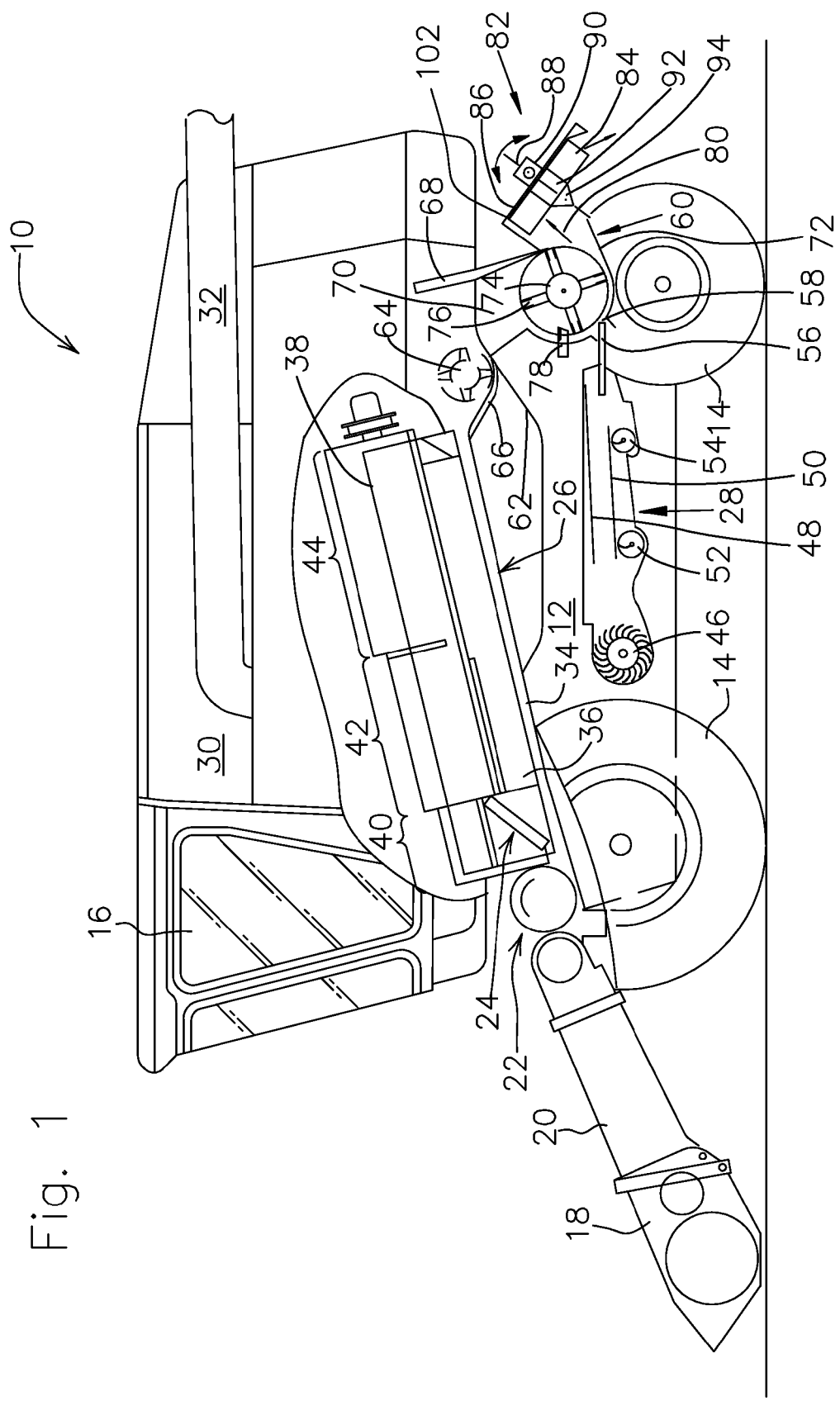
FIG. 1 shows a partial section of a side view of a combine with a straw chopper and impeller blowers.

FIG. 1 shows an agricultural combine 10 with a chassis 12 with wheels 14 in contact with the ground. Wheels 14 are fastened to the chassis 12 and are used for the forward propulsion of the combine 10 in the forward operating direction. The forward operating direction is to the left in FIG. 1. The operation of the combine 10 is controlled from the operator's cab 16. A cutter head 18 is used in order to harvest crop containing corn and to conduct it to a slope conveyor 20. The harvested crop is conducted by a guide drum 22 from the slope conveyor 20. The guide drum 22 guides the harvested crop through an inlet transition section 24 to an axial harvested crop processing arrangement 26.

The harvested crop processing arrangement 26 includes a rotor housing 34 and a rotor 36, arranged within it. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 is in the form of a truncated cone located in the charging section 40. The threshing section 42 includes a forward section in the form of a truncated cone and a cylindrical rear section. The cylindrical separating section 44 of the drum 38 is located at the end of the axial harvested crop processing unit 26. In place of an axial harvested crop processing unit 26 a tangential threshing drum with a following axial threshing section or a straw chopper could also be used.

Corn and chaff that fall through a thresher basket associated with the threshing section 42 and through a separating grate associated with the separating section 44 are conducted to a cleaning system 28 with a blower 46 and sieves 48, 50 with louvers. The sieves can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30. The clean corn in the corn tank 30 can be unloaded by means of an unloading screw conveyor 32 to a corn wagon, trailer, or truck. Harvested crop remaining at the lower end of the lower sieve 50 is again conducted to the harvested crop processing arrangement 26 by a screw conveyor 54 and an overhead conveyor (not shown). The harvested crop residue delivered at the upper end of the upper sieve 48 that consist essentially of chaff and small straw particles are conveyed by means of an oscillating sheet conveyor 56 to the rear and to a lower inlet 58 of a straw chopper 60.

Threshed-out straw leaving the separating section 44 is ejected through an outlet 62 from the harvested crop processing arrangement 26 and conducted to an ejection drum 64. The ejection drum 64 that interacts with a sheet 66 arranged underneath it to eject the straw to the rear. A wall 68 is located to the rear of the ejection drum 64. The wall 68 guides the straw into an upper inlet 70 of the straw chopper 60.

The straw chopper 60 is composed of a housing 72 with a rotor 74 arranged within it that can rotate about an axis extending horizontally and transverse to the direction of operation, and is also composed of chopper knives 76, pendulously suspended in pairs and distributed around the circumference of the rotor 74, that interact with opposing knives 78, fixed to the housing. Two impeller blowers 82 arranged side by side alongside each other, are provided downstream of an outlet 80 of the straw chopper 60. Only a single blower 82 can be seen in FIG. 1. The impeller blowers 82 include a number of impeller blades 84, each of which is connected rigidly to an upper circular disk 86, that can rotate about central axes 88. The disks 86 with the impeller blades 84 that extend radially can be brought into rotation by a hydraulic motor 90 that is attached above a bottom sheet 102 which is connected with the housing 72 of the straw chopper 60. At their radially inner ends the impeller blades 84 are connected to a cylindrical central body 92 that transitions into a cone 94 with a point on its end facing away from the disk 86. The impeller blades 84 are rectangular and the height of the body 92 (without cone 94) is equal to the height of the impeller blades 84. The cross section of the body 92 and the cone 94 is circular, although it could also have a multifaceted shape.

Figure 2:
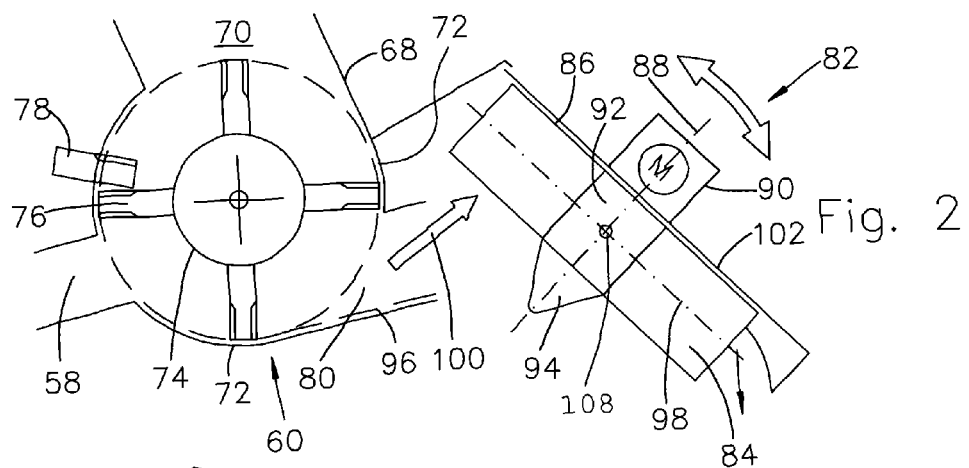
FIG. 2 shows an enlarged side view of the straw chopper and an impeller blower in a first operating position.

As can be seen in FIG. 2, the straw chopper 60 defines an outlet plane 96 extending at an angle to the rear and upward in which the harvested crop residue is ejected. The impeller blades 84 of the impeller blowers 82 on the other hand rotate in a plane 98 that extends to the rear and downward. The harvested crop residue are conveyed by the impeller blower 82 in the plane 98 of the impeller blades 84 and ejected to the rear and to the side and distributed on the field across the width of the cutter head 18. The lowest regions of the cone 94 including its point are arranged underneath the plane 96 of the outlet 80 in the operating position of the impeller blowers 82 according to FIG. 2. On the other hand, the regions of the cone 94 located above the plane 96 these arranged within the flow of the harvested crop residue ejected by the straw chopper.

As indicated by the arrow 100, the cone 94 deflects the harvested crop residue (straw and/or chaff) impacted on it from the straw chopper 60 upward and to the side, so that it can be engaged by the impeller blades 84. Due to the relatively large diameter of the body 92, the circumferential speed of all the areas of the impeller blowers 94 that interact with the flow of the harvested crop residue are sufficiently large so as to readily accommodate the flow of the harvested crop residue.

Figure 3:
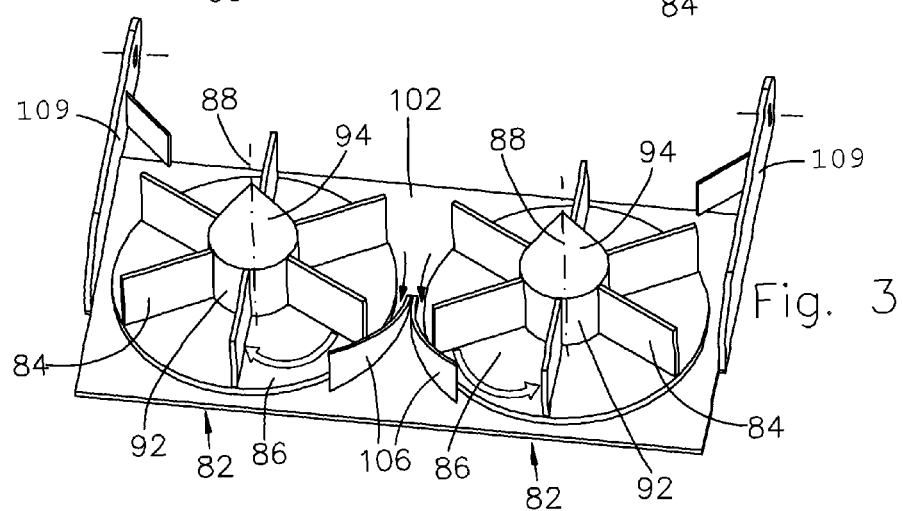
FIG. 3 shows a perspective view of the impeller blowers and their retention as seen from below.

FIG. 3 shows a perspective view of the impeller blowers 82 that operated in opposite directions during the operation. The directions of rotation are indicated by arrows on each impeller in FIG. 3. A harvested crop flow separating element 106, arranged to the rear of the axes of rotation 88 of the impeller blowers 82, includes a forward point that intrudes into the intermediate region between the impeller blowers, and two side walls, each of which adjoins an impeller blower 82. Retainers 109 are used to attach the bottom sheet 102 with the impeller blowers 82 at the housing 72 of the straw chopper 60.

Figure 4:
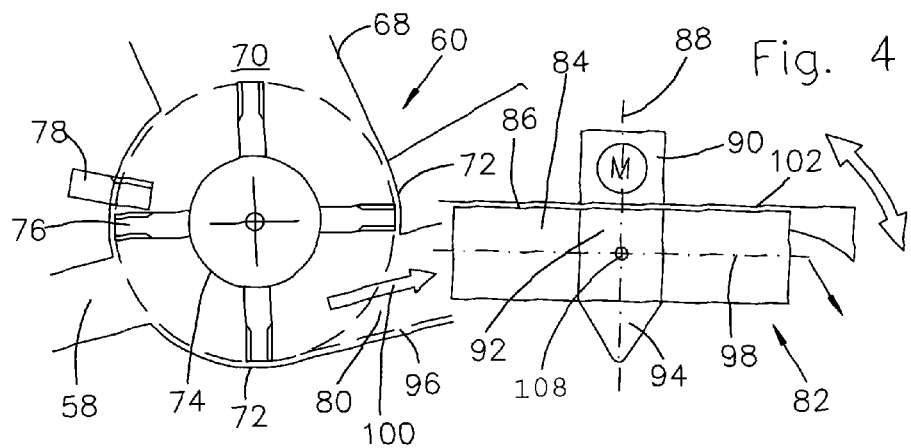
FIG. 4 shows an enlarged side view of the straw chopper and of an impeller blower in a second operating position.

The impeller blowers 82 can be adjusted by means of appropriate adjusting mechanisms to pivot about an axis 108 that extends through the center of the body 92 and also extends horizontally and transverse to the direction of operation. This relative pivoting can be seen in FIGS. 2 and 4; in which one pivoted position is shown in FIG. 2 and a second pivoted position is shown in FIG. 4. The pivoting can be performed manually by an operator or by means of external forces in order to vary the ejection distance of the impeller blowers.

It should be noted that an adjustable flap could still be arranged between the ejection drum 64 and the upper inlet 70 of the straw chopper 60 with which the straw can selectively slide past the rear of the straw chopper 60 and can be deposited in a swath on the field in the long straw deposit operation.

The invention claimed is:

1. A harvested crop residue chopper and distribution arrangement for a combine (10) comprising:
   a straw chopper (60) with an outlet (80) arranged in an outlet plane (96); and
   and at least one impeller blower (82) arranged downstream of the outlet (80) of the straw chopper (60), the at least one impeller blower (82) further comprising rotating impeller blades (84) rotating about an axis of rotation (88) disposed perpendicular to a plane (98) of the impeller blower blades (84), wherein the plane (98) of the impeller blower blades (84) is inclined relative to the outlet plane (96);
   wherein the impeller blades (84) are connected to a central, cylindrical body (92) that is connected to a cone (94) facing the outlet (80) of the straw chopper (60); and
   wherein the impeller blower (82) is adjustable about a fixed axis (108) that extends through the center of the body (92) and horizontally and transverse to the forward operating direction relative to the straw chopper (60).

2. The harvested crop residue chopper and distribution arrangement according to claim 1, wherein the plane of the impeller blower (98) is inclined to the rear and downward relative to the outlet plane (96).

3. The harvested crop residue chopper and distribution arrangement according to claim 1, wherein the cone (94) extends in the direction of the axis of rotation (88) and is located entirely beyond the impeller blades (84).

4. A combine (10) with a harvested crop residue chopper and distribution arrangement according to claim 1.

5. The harvested crop residue chopper and distribution arrangement according to claim 2, wherein the impeller blower (82) is adjustable about said fixed axis (108) so as to selectively dispose the plane (98) of the impeller blades at different angles relative to the plane (96) of the chopper outlet 80.

6. The harvested crop residue chopper and distribution arrangement according to claim 2, wherein the cone (94) extends in the direction of the axis of rotation (88) beyond the impeller blades (84).

7. A combine (10) with a harvested crop residue chopper and distribution arrangement according to claim 2.

8. A combine (10) with a harvested crop residue chopper and distribution arrangement according to claim 3.

* * * * *